United States Patent [19]

Sutcliffe et al.

[11] 4,103,936

[45] Aug. 1, 1978

[54] NOZZLE SPOUT COUPLING

[75] Inventors: Grenville G. Sutcliffe, Villa Ridge; Roy F. Washausen, St. Louis; William L. Tomes, St. Clair; Herman Ray Gould, Sullivan, all of Mo.

[73] Assignee: Husky Corporation, Pacific, Mo.

[21] Appl. No.: 768,204

[22] Filed: Feb. 14, 1977

[51] Int. Cl.² .............................. F16L 35/00
[52] U.S. Cl. ......................... 285/26; 285/131; 285/341; 285/382.4
[58] Field of Search ............ 285/131, 132, 341, 382.7, 285/382.4, 342, 25, 26, 28, 29, 137 R, 1 B; 29/157 R, 523

[56] References Cited

U.S. PATENT DOCUMENTS

| 2,204,756 | 6/1940 | Hosse et al. | 285/137 R |
| 2,335,414 | 11/1943 | Hinrichs | 29/520 X |
| 2,497,273 | 2/1950 | Richardson | 285/342 X |
| 3,017,695 | 1/1962 | James | 29/523 |
| 3,305,249 | 2/1967 | Zahuranee | 285/137 R X |

FOREIGN PATENT DOCUMENTS 884,283  4/1943  France .................. 285/341

Primary Examiner—Dave W. Arola
Attorney, Agent, or Firm—F. Travers Burgess

[57] ABSTRACT

The invention provides a fluid tight coupling for securing the spout of fuel dispensing nozzles to the nozzle body and utilizes a metallic annular gland mounted on the upstream end of the spout and positioned thereon by the engagement of a knurled band on the spout with its inner surface by mechanical expansion of the spout, the gland being outwardly shaped and positioned on the spout to be tightly engaged and compressed between tapered surfaces and the body outlet nipple rim and the spout securing clamp nut, with the downstream portion of the gland compressed thereby into tight sealing engagement with a smooth surface portion of the spout to effect a tight fluid seal.

8 Claims, 4 Drawing Figures

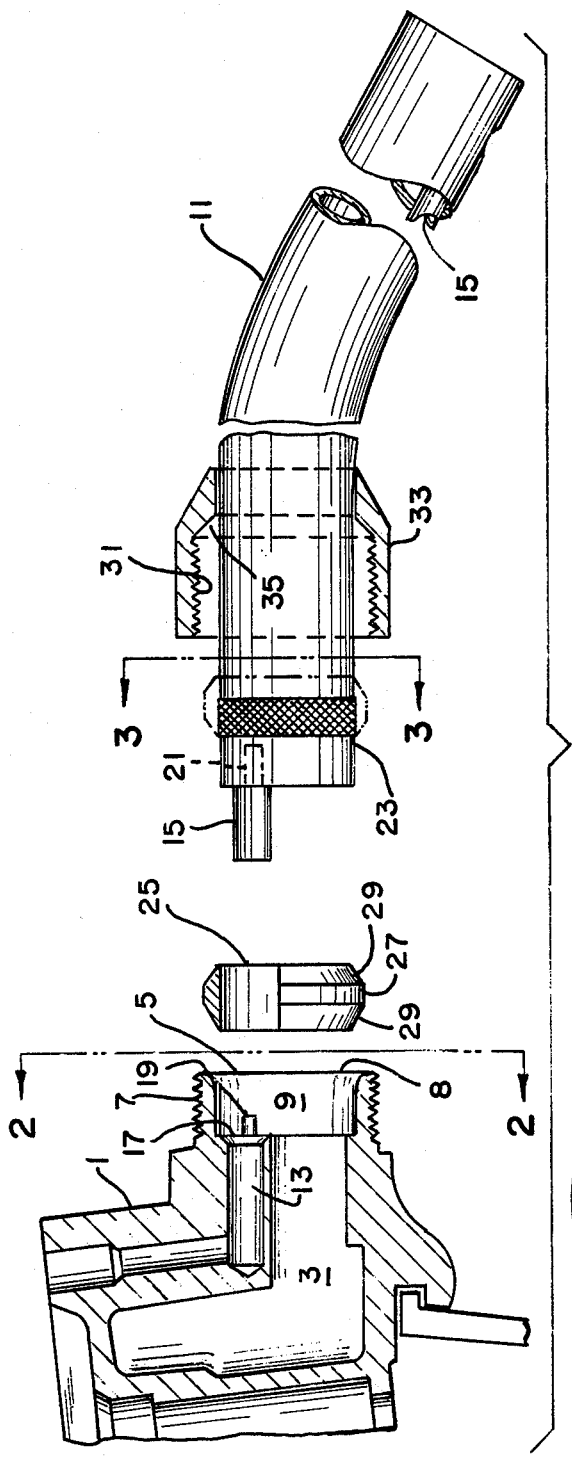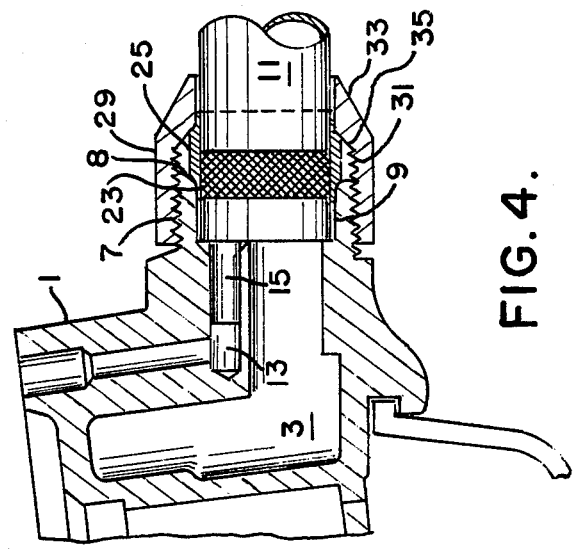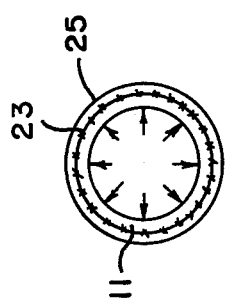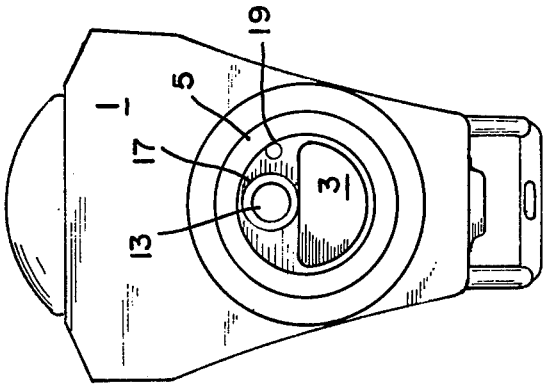

NOZZLE SPOUT COUPLING

BACKGROUND OF THE INVENTION

1. Field of the Invention:

The invention relates to fuel dispensing nozzles and consists particularly in a coupling for sealingly securing spouts to nozzle bodies.

2. The Prior Art:

Couplings for securing spouts to fuel dispensing nozzles have utilized spouts with enlarged inlet ends jointed by a tapered portion to the main part of the spout and secured to the nozzle body by a clamp nut engageable with the tapered portion of the spout, as exemplified by the coupling illustrated in D. L. Billian U.S. Pat. No. 3,796,908, and have included gaskets, sealing rings or glands of elastomeric and plastic materials, such as nylon, but many of these sealing means have been subject to attack and destruction by ingredients of the fuel dispensed through the nozzle.

SUMMARY OF THE INVENTION

The invention provides an improved fluid tight coupling for a fuel dispensing nozzle, of all-metal construction and hence not subject to the deteriorating effect of fuel ingredients on many types of elastomeric and plastic materials frequently used for packing glands in such couplings.

The invention further provides a metallic packing gland and means for fixing its position lengthwise of the spout to form a shoulder on the spout engaging the clamp nut and to facilitate deformation of the gland into sealing relation with the spout and outlet nipple by co-action of the dispensing nozzle body outlet nipple and the spout securing clamp nut.

The invention further provides novel means for fixing the position of a metallic gland on the spout by knurling a band around the entire spout of less width than the length of the metallic gland, positioning the gland on the spout with its upstream portion overlying the knurled portion of the spout and its downstream portion overlying a smooth portion of the spout and expanding the spout slightly to cause the knurling to interlock with the inner surface of the gland and thereby fix the gland against movement lengthwise of the spout.

The invention further provides for forming the gland with a cylindrical inner surface and tapered ends on its outer surface and positioning the gland on the spout such that when the clamp nut is tightened on the body outlet nipple the upstream taper of the gland will be engaged by and deformed by the tapered rim of the nipple and the downstream taper on the gland will be engaged by and deformed by the inward taper on the clamp nut into sealing engagement with the underlying smooth surface of the spout.

BRIEF DESCRIPTION OF THE DRAWINGS

FIG. 1 is a disassembled view of the outlet portion of a nozzle body, the spout and coupling means constructed in accordance with the invention.

FIG. 2 is a front elevational view of the nozzle body portion taken from line 2—2 of FIG. 1.

FIG. 3 is a transverse vertical sectional view through the spout taken along line 3—3 of FIG. 1 and illustrating the method of fixing the position of the gland on the spout.

FIG. 4 is an assembled view of the outlet portion of the nozzle body and the spout showing the relative positions of the knurling, the gland, the body outlet nipple and the spout securing clamp nut.

DETAILED DESCRIPTION OF THE INVENTION

The numeral 1 denotes the outlet portion of a fuel dispensing nozzle body including main fuel passage 3 and outlet nipple 5 externally threaded as at 7. Outlet nipple 5 is formed with a shallow cylindrical recess 9 to matingly receive the inlet end of spout 11, and a vacuum vent passage 13 is formed in the nozzle body and communicates with nipple recess 9 above main fuel passage outlet 3.

Spout 11 includes the usual vacuum vent tube which projects from its inlet end for extension into vent passage 13 through the flared opening 17 of the latter into the nipple recess.

For properly positioning the spout inlet in the body nipple recess so as to align spout vent tube 15 with body vent passage 13, a pin 19 is positioned in the inner end of recess 9 near its periphery, and a short slot 21 is formed at a corresponding location in the inlet end of the spout.

A short distance from the inlet end of the spout, the outer surface of the spout is knurled at 23 in the form of a band and an annular brass gland 25 having a short cylindrical external surface 27 and tapered ends 29 is slipped over the inlet end of the spout until its inner edge is flush with knurled band 23 and its downstream end projects beyond knurled band 23.

The knurled band 23 of the spout is then expanded 0.003 to 0.004 inch by a mandrel inserted in the inlet end of the spout to lock brass gland 25 on the spout in a fixed position lengthwise of the spout.

The spout is then inserted into the recess 9 in the body outlet nipple and internal threads 31 of clamp nut 33 surrounding the spout are engaged with external threads 7 on body outlet nipple 5, the tapered end 35 of nut 37 engaging downstream tapered end 29 of gland 25 to force the upstream tapered end 29 of gland 25 into sealing engagement with the radially tapered rim 8 of the body outlet nipple, with consequent deformation of gland 25 into the shape shown in FIG. 4, with the spout fully seated in the nipple recess and sealed therein. The tight engagement of the downstream end of gland 25 with the smooth surface of the spout caused by the pressure of clamp nut 35 on the downstream taper 29 of gland 25 provides a tight fluid seal between the nozzle body and spout, and the longitudinal fixation of the gland on the spout prevents undesired removal of the spout from the nozzle body while the clamp nut is tight.

The details of the structure may be varied substantially without departing from the spirit of the invention and the exclusive use of such modifications as come within the scope of the appended claims is contemplated.

We claim:

1. In a dispensing nozzle, a nozzle body having an outlet nipple with external threads, a main fuel passage communicating with said nipple, a replaceable spout assembly comprising a cylindrical spout having its inlet end matingly received in said nipple and an annular gland mounted on the inlet end of said spout with its upstream end engaged by the rim of said nipple, said spout being formed with a knurled band and a smooth surface adjacent thereto, said knurled band underlying only the upstream end of said gland and radially expanded into locking engagement with said gland, and a clamp nut on said spout having internal threads engaged with said nipple external threads and having an internal taper at its downstream end in compressive engagement with the downstream end of said gland for compressing the latter radially into sealing engagement with said smooth surface of said spout downstream from said knurled band and for compressing said gland axially and sealingly against the rim of said nipple and thereby coupling said spout securely to said nozzle body.

2. In a fuel dispensing nozzle according to claim 1, said gland being of deformable metallic material.

3. In a dispensing nozzle according to claim 1, said outlet nipple rim having an internal taper and the upstream and downstream ends of said gland being externally tapered to facilitate seating said gland between said nipple and the downstream end of said nut 4. In a dispensing nozzle according to claim 3, said nozzle body being formed with a vacuum vent passage of smaller diameter than said nipple and extending axially of said nipple and communicating with the inner end thereof, said spout assembly having a vacuum vent tube projecting from the inlet end of said spout and being matingly received in the end portion of said body vent passage, and means for positioning said spout assembly in said nipple with said tube and said vent passage in axial registry with each other.

5. In a dispensing nozzle according to claim 4, said spout positioning means comprising a pin fixedly positioned in said nipple adjacent the periphery thereof and extending axially thereof and a corresponding slot in said spout extending axially downstream from the inlet end thereof.

6. A coupling for sealingly securing an assembly comprising a tubular member and an annular gland mounted on one end of said tubular member to another member having an externally threaded hollow cylindrical portion for internally receiving said tubular member, said tubular member being formed on one end with a knurled band and a smooth surface adjacent thereto, said knurled band underlying only the end of said gland adjacent said cylindrical portion and expanded into locking engagement with said gland, and a clamp nut on said tubular member having internal threads engaged with said cylindrical portion external threads and having an internal taper at its other end in compressive engagement with the other end of said gland for compressing the latter radially into sealing engagement with said smooth surface of said tubular member and for compressing said gland axially and sealingly against the rim of said cylindrical portion and thereby coupling said tubular member securely to said other member.

7. A coupling according to claim 6 wherein the rim of said cylindrical portion has an internal taper and the ends of said gland are externally tapered to facilitate seating said gland between said cylindrical portion rim and the internal taper of said clamp nut.

8. A coupling according to claim 7 wherein said gland is of deformable metallic material.

* * * * *